(12) United States Patent
Shpigelman et al.

(10) Patent No.: US 11,296,988 B2
(45) Date of Patent: *Apr. 5, 2022

(54) PROGRAMMABLE CONGESTION CONTROL COMMUNICATION SCHEME

(71) Applicant: Mellanox Technologies, Ltd., Yokneam (IL)

(72) Inventors: Yuval Shpigelman, Netanya (IL); Idan Burstein, Carmiel (IL); Noam Bloch, Bat Shlomo (IL); Reut Zuck, Haifa (IL); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,428

(22) Filed: Aug. 6, 2020

(65) Prior Publication Data

US 2021/0152474 A1    May 20, 2021

Related U.S. Application Data

(63) Continuation-in-part of application No. 16/683,302, filed on Nov. 14, 2019.

(51) Int. Cl.
*H04L 1/00* (2006.01)
*H04L 47/12* (2022.01)
(Continued)

(52) U.S. Cl.
CPC .......... *H04L 47/12* (2013.01); *H04L 47/2441* (2013.01); *H04L 47/25* (2013.01); *H04L 67/104* (2013.01); *H04L 69/22* (2013.01)

(58) Field of Classification Search
CPC ..... H04L 47/12; H04L 47/2441; H04L 47/25; H04L 67/104; H04L 69/22
See application file for complete search history.

(56) References Cited

U.S. PATENT DOCUMENTS 6,741,555 B1 * 5/2004 Li ........................... H04L 47/10
 370/229
7,000,025 B1 * 2/2006 Wilson .................... H04L 47/31
 709/235

(Continued)

FOREIGN PATENT DOCUMENTS

EP     2916521 A1    9/2015

OTHER PUBLICATIONS

EP Application # 20207427.4 Search Report dated Apr. 7, 2021.
(Continued)

*Primary Examiner* — Abdelnabi O Musa
(74) *Attorney, Agent, or Firm* — Kligler & Associates Patent Attorneys Ltd

(57) ABSTRACT

A network adapter includes a receive (Rx) pipeline, a transmit (Tx) pipeline and congestion management circuitry. The Rx pipeline is configured to receive packets sent over a network by a peer network adapter, and to process the received packets. The Tx pipeline is configured to transmit packets to the peer network adapter over the network. The congestion management circuitry is configured to receive, from the Tx pipeline and from the Rx pipeline, Congestion-Control (CC) events derived from at least some of the packets exchanged with the peer network adapter, to exchange user-programmable congestion control packets with the peer network adapter, and to mitigate a congestion affecting one or more of the packets responsively to the CC events and the user-programmable congestion control packets.

18 Claims, 4 Drawing Sheets

(51) Int. Cl.
*H04L 47/2441* (2022.01)
*H04L 69/22* (2022.01)
*H04L 67/104* (2022.01)
*H04L 47/25* (2022.01)

(56) References Cited

U.S. PATENT DOCUMENTS

| | | | |
|---|---|---|---|
| 7,035,220 B1* | 4/2006 | Simcoe | H04L 47/10 |
| | | | 370/236 |
| 2007/0070901 A1 | 3/2007 | Aloni et al. | |
| 2007/0248013 A1* | 10/2007 | Sridharan | H04L 47/2475 |
| | | | 370/235 |
| 2009/0282291 A1 | 11/2009 | Fitzgerald et al. | |
| 2015/0009817 A1* | 1/2015 | Sato | H04L 47/25 |
| | | | 370/230.1 |
| 2016/0380896 A1 | 12/2016 | Caulfield et al. | |
| 2017/0093699 A1* | 3/2017 | Crupnicoff | H04L 47/33 |
| 2017/0149666 A1* | 5/2017 | Kiykioglu | H04L 47/27 |
| 2020/0334195 A1* | 10/2020 | Chen | H04L 67/1097 |

OTHER PUBLICATIONS

U.S. Appl. No. 16/683,302 Office Action dated Mar. 2, 2021.
Almeida et al., "Explicit rate congestion control with binary notifications", 10th IEEE Workshop on Local and Metropolitan Area Networks, pp. 1-10, Nov. 21-24, 1999.
Ramakrishnan et al., "The Addition of Explicit Congestion Notification (ECN) to IP", Request for Comments: 3168, pp. 1-63, Sep. 2001.
Shpigelman et al., U.S. Appl. No. 16/683,302, filed Nov. 14, 2019.
EP Application # 21189944.8 Search Report dated Jan. 4, 2022.

* cited by examiner

| start-Byte | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | Base Version = 0x01 | | | | | | | | Class = FW CR | | | | | | | | Class Version = FW CR | | | | | | | | R | Method | | | | | |
| 4 | Status | | | | | | | | | | | | | | | | Reserved | | | | | | | | | | | | | | | |
| 8 | Flow Tag (Transaction ID high) | | | | | | | | | | | | | | | | | | | | | | | | | | | | | | | |
| 12 | Reserved | | | | | | | | Attribute ID = FW CR | | | | | | | | PSN (Transaction ID low) | | | | | | | | | | | | | | | |
| 16 | Reserved | | | | | | | | | | | | | | | | Attribute Modifier | | | | | | | | | | | | | | | |
| 20 | Key High = FW CR (changes every ~1 sec) | | | | | | | | | | | | | | | | | | | | | | | | | | | | | | | |
| 24 | Key Low = FW CR (changes every ~1 sec) | | | | | | | | | | | | | | | | | | | | | | | | | | | | | | | |
| 28 | Capability Mask = CR FW (8 bits only; others are "0") | | | | | | | | | | | | | | | | | | | | | | | | | | | | | | | |
| 32 | CC Message Type | | | | | | | | | | | | | | | | CC Message Size (in DW) | | | | | | | | | | | | | | | |
| 36 | CC Message - first DW | | | | | | | | | | | | | | | | | | | | | | | | | | | | | | | |
| 40 | | | | | | | | | | | | | | | | | | | | | | | | | | | | | | | | |
| 44 | | | | | | | | | | | | | | | | | | | | | | | | | | | | | | | | |
| ... | ... | | | | | | | | | | | | | | | | | | | | | | | | | | | | | | | |
| 252 | CC Message - last DW | | | | | | | | | | | | | | | | | | | | | | | | | | | | | | | |

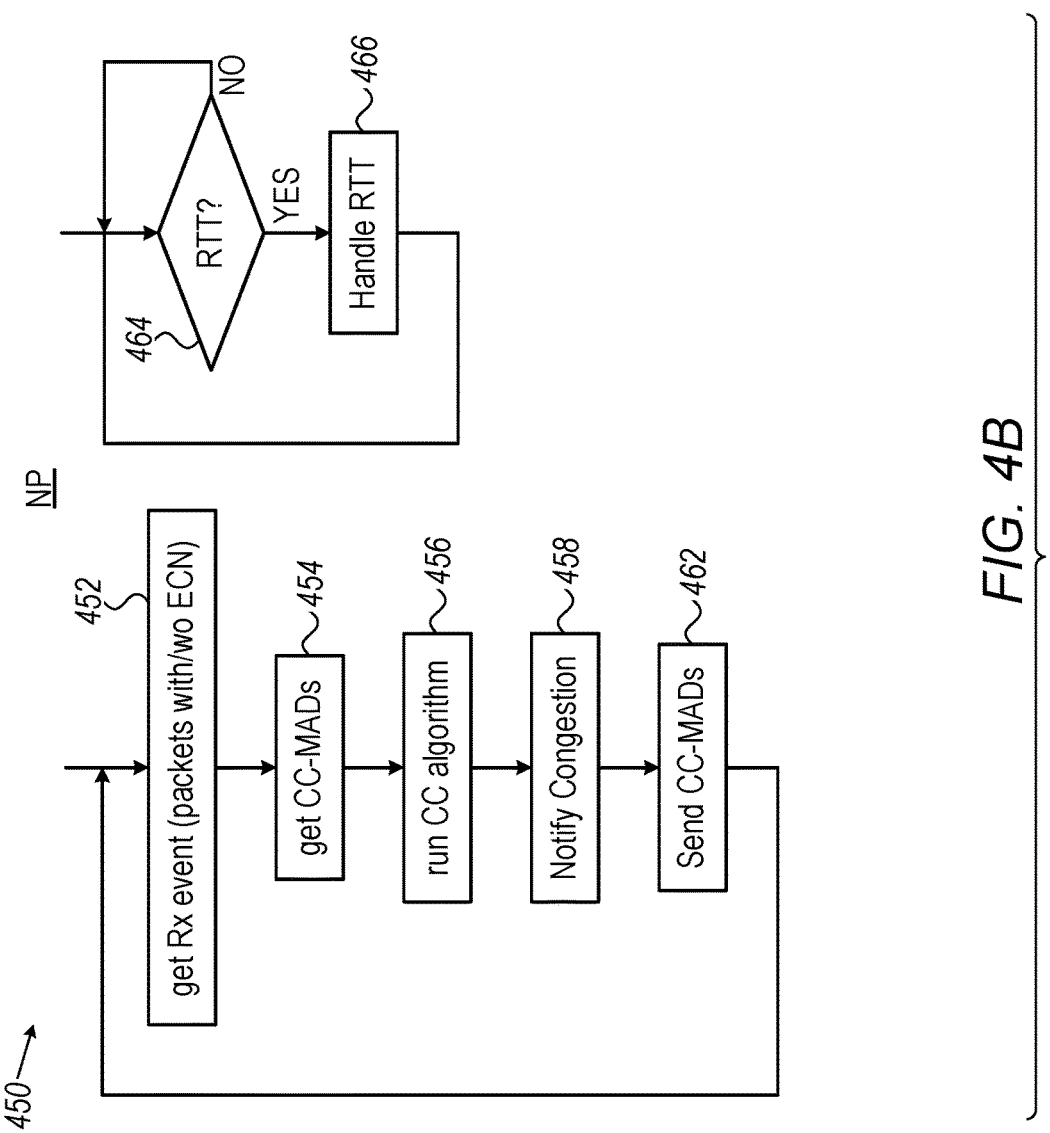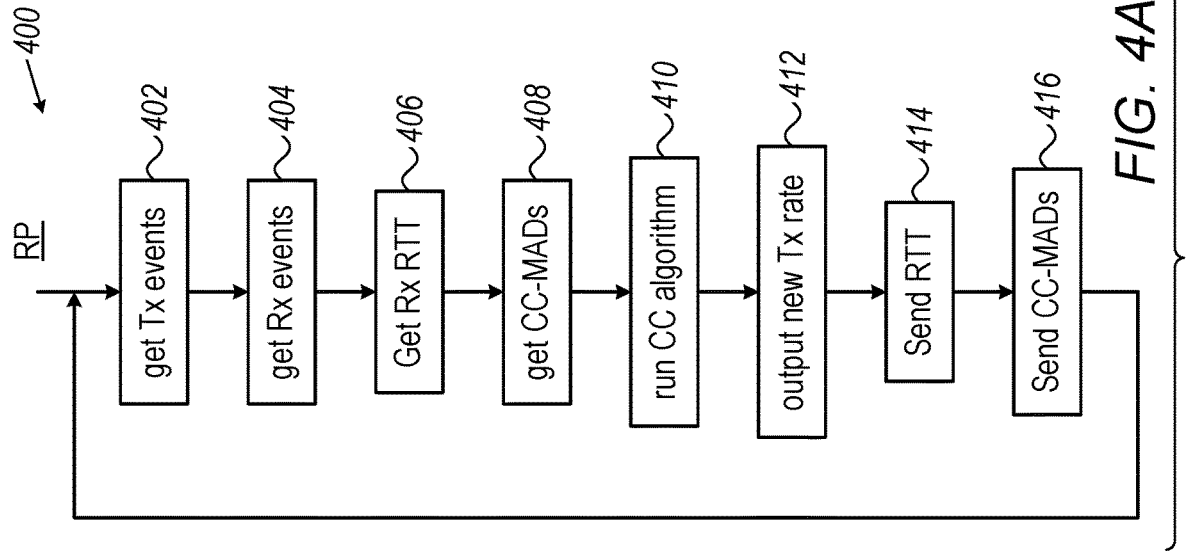

PROGRAMMABLE CONGESTION CONTROL COMMUNICATION SCHEME

CROSS-REFERENCE TO RELATED APPLICATIONS

This application is a continuation-in-part of U.S. patent application Ser. No. 16/683,302, filed Nov. 14, 2019, whose disclosure is incorporated herein by reference.

FIELD OF THE INVENTION

The present invention relates generally to packet communication networks, and particularly to methods and systems for congestion control in such networks.

BACKGROUND OF THE INVENTION

Congestion management of packet traffic in communication systems is important as poor congestion control may significantly impact system performance.

Some congestion control techniques are used in the industry, for example, "Explicit rate congestion control with binary notifications," by Almeida and Belo, $10^{th}$ IEEE Workshop on Local and Metropolitan Area Networks, Nov. 21-24, 1999, describes a rate-based source adaptation algorithm for packet-switching network, in which binary notifications are sent to the sources, reflecting a positive or negative difference between the source rate and the estimated fair rate, and based on these notifications, the sources increase or decrease the transmit rate.

Internet Engineering Task Force (IETF) RFC 3168, entitled "The Addition of Explicit Congestion Notification (ECN) to IP," September, 2001, specifies the incorporation of Explicit Congestion Notification (ECN) to TCP and IP, including ECN's use of two bits in the IP header.

SUMMARY OF THE INVENTION

An embodiment of the present invention that is described herein provides a network adapter including a receive (Rx) pipeline, a transmit (Tx) pipeline and congestion management circuitry. The Rx pipeline is configured to receive packets sent over a network by a peer network adapter, and to process the received packets. The Tx pipeline is configured to transmit packets to the peer network adapter over the network. The congestion management circuitry is configured to receive, from the Tx pipeline and from the Rx pipeline, Congestion-Control (CC) events derived from at least some of the packets exchanged with the peer network adapter, to exchange user-programmable congestion control packets with the peer network adapter, and to mitigate a congestion affecting one or more of the packets responsively to the CC events and the user-programmable congestion control packets.

In some embodiments, the congestion affects the packets transmitted to the peer network adapter, and the congestion management circuitry is configured to throttle, depending on the CC events and the user-programmable congestion control packets, a transmission rate of the packets transmitted by the Tx pipeline. In other embodiments, the congestion affects the packets received from the peer network adapter, and the congestion management circuitry is configured to generate a congestion notification based on the CC events and the user-programmable congestion control packets, and to send the congestion notification to the peer network adapter.

In an embodiment, the congestion management circuitry supports an Application Programming Interface (API) for receiving user-defined Congestion-Control (CC) software code, and to mitigate the congestion by running the CC software code. In another embodiment, the programmable congestion control packets have a format of Management Datagram (MAD) packets.

In some embodiments, the congestion management circuitry includes hardware congestion-control-circuitry configured to pre-process the CC events, and a user-programmable congestion control processor configured to mitigate the congestion responsively to the pre-processed CC events. The hardware congestion-control-circuitry may be configured to coalesce two or more of the CC events, and to provide the coalesced CC events to the congestion control processor.

There is additionally provided, in accordance with an embodiment of the present invention, a method for communication. The method includes, using a receive (Rx) pipeline of a network adapter, receiving packets sent over a network by a peer network adapter, and processing the received packets. Packets are transmitted to the peer network adapter over the network using a transmit (Tx) pipeline of the network adapter. Using congestion management circuitry in the network adapter, Congestion-Control (CC) events derived from at least some of the packets exchanged with the peer network adapter are received from the Tx pipeline and from the Rx pipeline. User-programmable congestion control packets are exchanged with the peer network adapter. A congestion affecting one or more of the packets is mitigated responsively to the CC events and the user-programmable congestion control packets.

There is also provided, in accordance with an embodiment of the present invention, a network adapter including a receive (Rx) pipeline, a transmit (Tx) pipeline and management circuitry. The Rx pipeline is configured to receive packets sent over a network by a peer network adapter, and to process the received packets. The Tx pipeline is configured to transmit packets to the peer network adapter over the network. The management circuitry is configured to receive, from the Tx pipeline and from the Rx pipeline, events derived from at least some of the packets exchanged with the peer network adapter, exchange user-programmable control packets with the peer network adapter, and perform a control operation responsively to the events and the user-programmable control packets.

There is further provided, in accordance with an embodiment of the present invention, a method for communication, including, using a receive (Rx) pipeline of a network adapter, receiving packets sent over a network by a peer network adapter, and processing the received packets. Packets are transmitted to the peer network adapter over the network using a transmit (Tx) pipeline of the network adapter. Using management circuitry in the network adapter, events derived from at least some of the packets exchanged with the peer network adapter are received from the Tx pipeline and from the Rx pipeline. User-programmable control packets are exchanged with the peer network adapter. A control operation is performed responsively to the events and the user-programmable control packets.

The present invention will be more fully understood from the following detailed description of the embodiments thereof, taken together with the drawings in which:

Figure 2:
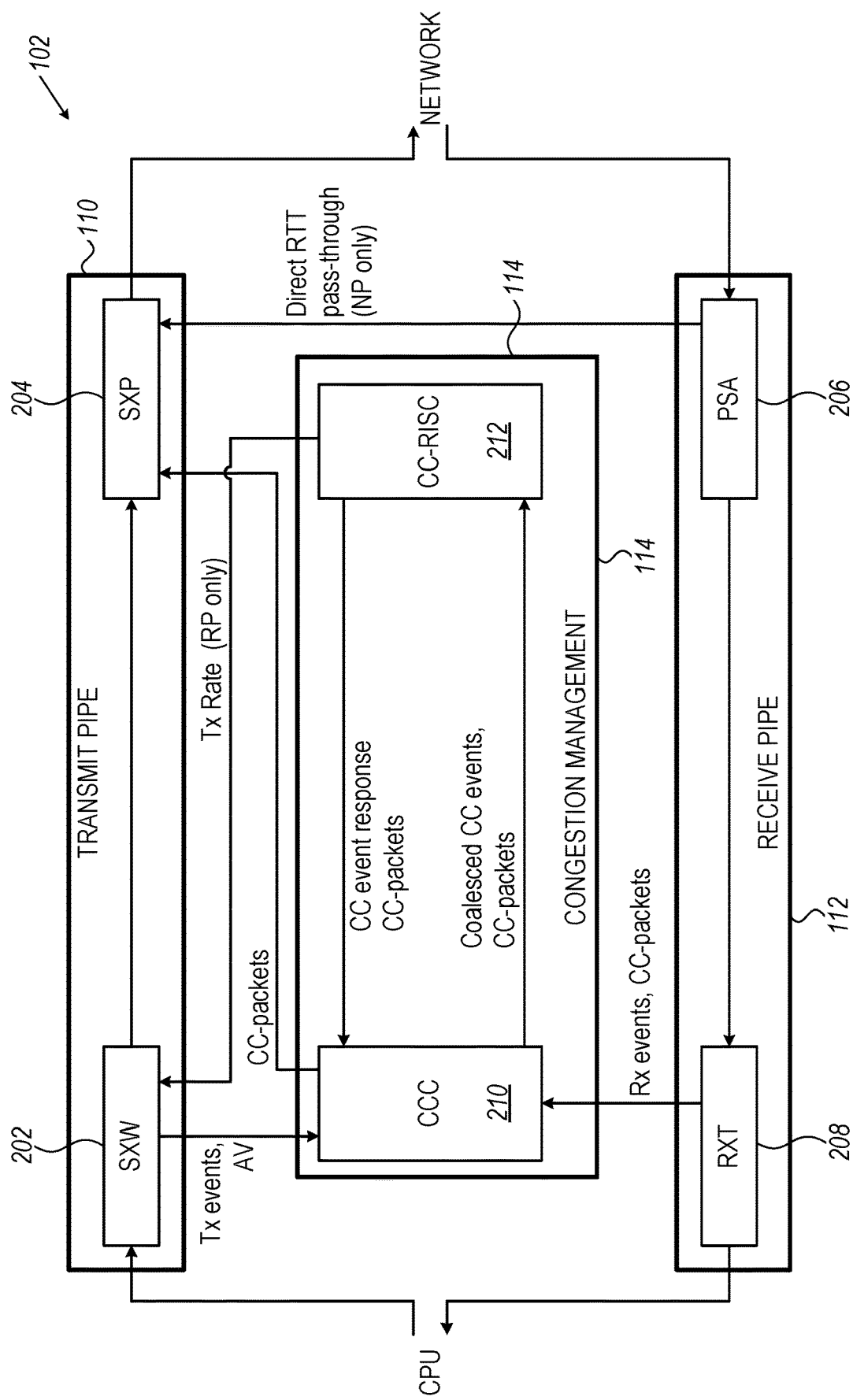

over Converged Ethernet (RoCE) with congestion mitigation, in accordance with an embodiment of the present invention;

FIG. 2 is a block diagram that schematically illustrates the structure of a Network Adapter, according to embodiments of the present invention;

FIG. 3 is a table that schematically illustrates the structure of a Congestion Control Management Datagram (CC-MAD) in accordance with an embodiment of the present invention;

FIG. 4A is a flowchart that schematically illustrates congestion control flow in a network adapter that is configured as a reaction point (RP), in accordance with an embodiment of the present invention; and FIG. 4B is a flowchart that schematically illustrates congestion control flow in a network adapter that is configured as a notification point (NP), in accordance with an embodiment of the present invention.

DETAILED DESCRIPTION OF EMBODIMENTS

Overview

Transmission Control Protocol (TCP) was introduced in 1974, but its Congestion Control (CC) algorithms keep evolving. CC algorithms change the transmit rate of packets from a source that transmits packets (e.g., a network adapter in a source node), in response to congestion notifications that the source receives. Congestion notifications are typically added to a packet stream (either as a separate packet, or as an additional information in an existing packet). When the packets reach their destination (e.g., a network adapter in a destination node), the destination sends the congestion notifications back to the source, which may decrease the transmit rate in response to the notification (or increase the rate if no congestion notifications are received).

Numerous CC algorithms have been (and still are) suggested, pertaining to the setting of the transmit rate in response to congestion notifications (see, for example, U.S. Pat. No. 7,000,025). CC algorithms may be, for example, flow-oriented, and the rate of each flow of packets may be independently controlled, in response to congestion notifications pertaining to packets of the same flow.

Congestion Control (CC) algorithms may be executed by software that runs on a host processor, or, by dedicated hardware. There are some major disadvantages to software implementation on a host. First, host software implementations typically exhibit long latency caused by the context switching required to handle congestion notifications; secondly, host software implementations consume significant CPU resources; and, lastly, algorithms that are executed by host software require communication between the network adapter and the host, over a bus. On the other hand, software implementations are typically flexible, allowing easy adaptations to new CC algorithms and to changing network configurations, whereas hardware implementations tend to be rigid and hard to modify.

Efficient congestion control algorithms may need to measure the round-trip delay of the network, from the sending network adapter to the receiving network adapter, and back. Such measurement is typically done using a Round-Trip-Time (RTT) measurement packet, which is initiated by the sending network adapter and routed back by the receiving network adapter, wherein each network adapter adds timestamps pertaining to the time in which the network adapter receives and/or sends the RTT packet.

Some congestion control algorithms may need to transfer additional data between the sending and the receiving network adapters, using additional control/notification packets.

Embodiments according to the present invention that are disclosed herein provide flexible and fast network adapters, with programmable congestion management. The congestion management may be used in both the sending and the receiving network adapters, which communicate using congestion notifications, proprietary programmable congestion control packets and RTT measurement packets.

The description that follows refers to Network Adapters. In some embodiments, a network adapter may comprise an Ethernet Network Interface Controller (NIC); in other embodiments the Network Adapter may comprise InfiniBand® Host Channel Adapters (HCAs), an in yet other embodiments any other suitable network adapter may be used.

We will refer hereinbelow to the network adapter that receives the data (and receives congestion notifications) as a Notification Point (NP), and to the network adapter that sends the data (and may need to react to congestion notifications) as Reaction Point (RP). As would be appreciated, both the NP and the RP may send and receive packets, and the terms NP and RP refer to a particular congestion-controlled flow of packets only.

The Network Adapter, in each of the NP and the RP, typically comprises one or more ingress ports, that receive packets from a network and send the packets to further input processing (e.g., parsing, queuing and steering); and one or more egress ports, that receive packets that are processed (e.g., steered and queued) and send the packets to the network. In the description hereinbelow, we will refer to the aggregation of the ingress ports and the further input processing as the Receive Pipe, and to the aggregation of the egress packet processing and the egress ports as the Transmit Pipe.

In some embodiments, the network adapter further comprises a Congestion Management circuit, to which the Receive and Transmit pipes send congestion related events. The congestion related events may comprise Tx events for each predefined burst of sent packets, and Rx events for the following received packets: positive and negative acknowledgment (ACK and NACK) packets; congestion notification packets (packets that are sent back by a peer network adapter in response to the sent packets), RTT measurement packets and user defined programmable congestion control packets.

In an embodiment, the Congestion Management circuit executes Congestion Control algorithms and may issue responses to the peer network adapter. In an RP, the Congestion Management circuit is further configured to throttle the transmit rate of the network adapter, reducing the rate to mitigate congestion, and, when the congestion is mild (or non-existent), increasing the transmit rate to improve performance.

Some congestion control algorithms may require transfer of information between an NP and an RP. One example is RTT packets; but, to allow a variety of congestion control algorithms, other needs may arise (for example, sending credits in a credit-based congestion control algorithm). Embodiments of the present invention allow sending and receiving of generic user-programmable congestion control messages between the NP and the RP. In an embodiment, the user-programmable congestion control packets have the format of Message Datagrams (MADs), as defined by InfiniBand™ (the congestion control MADs are referred to as CC-MADs). In other embodiments, different formats of congestion control packets may be used, instead of or in addition to the MADs.

In an embodiment, the Congestion Management circuit comprises a Congestion Control Circuit (CCC) and a Congestion Control Reduced-Instruction-Set-Computer (CC-RISC), wherein the CC-RISC is configured to run programmable congestion control algorithms, and the CCC is configured to receive congestion control inputs including congestion events and CC-packets, pre-process (e.g., queue and coalesce) the congestion control inputs, and send the inputs to the CC-RISC. In an embodiment, the Receive and Transmit pipes may send some or all the congestion control inputs directly to the CC-RISC. In another embodiment, some of the congestion control algorithms may be implemented by circuitry other than the CC-RISC, e.g., the CCC or the Receive/Transmit pipes.

In some embodiments, the CC-RISC may comprise a commercially available RISC core, e.g., RISC-V, ARM or any other suitable processor. In other embodiments a plurality of processors, of the same or of different types, may be used.

We will refer, in some of the example embodiments below, to Remote Direct Memory Access (RDMA) over Converged Ethernet (RoCE); however, the techniques disclosed herein are not limited to RoCE, and may be used in any suitable network configurations, e.g., Non-Volatile Memory Over Fabric (NVM-F).

Further aspects of programmable congestion control are addressed in U.S. patent application Ser. No. 16/683,302, filed Nov. 14, 2019, cited above.

System Description

Figure 1:
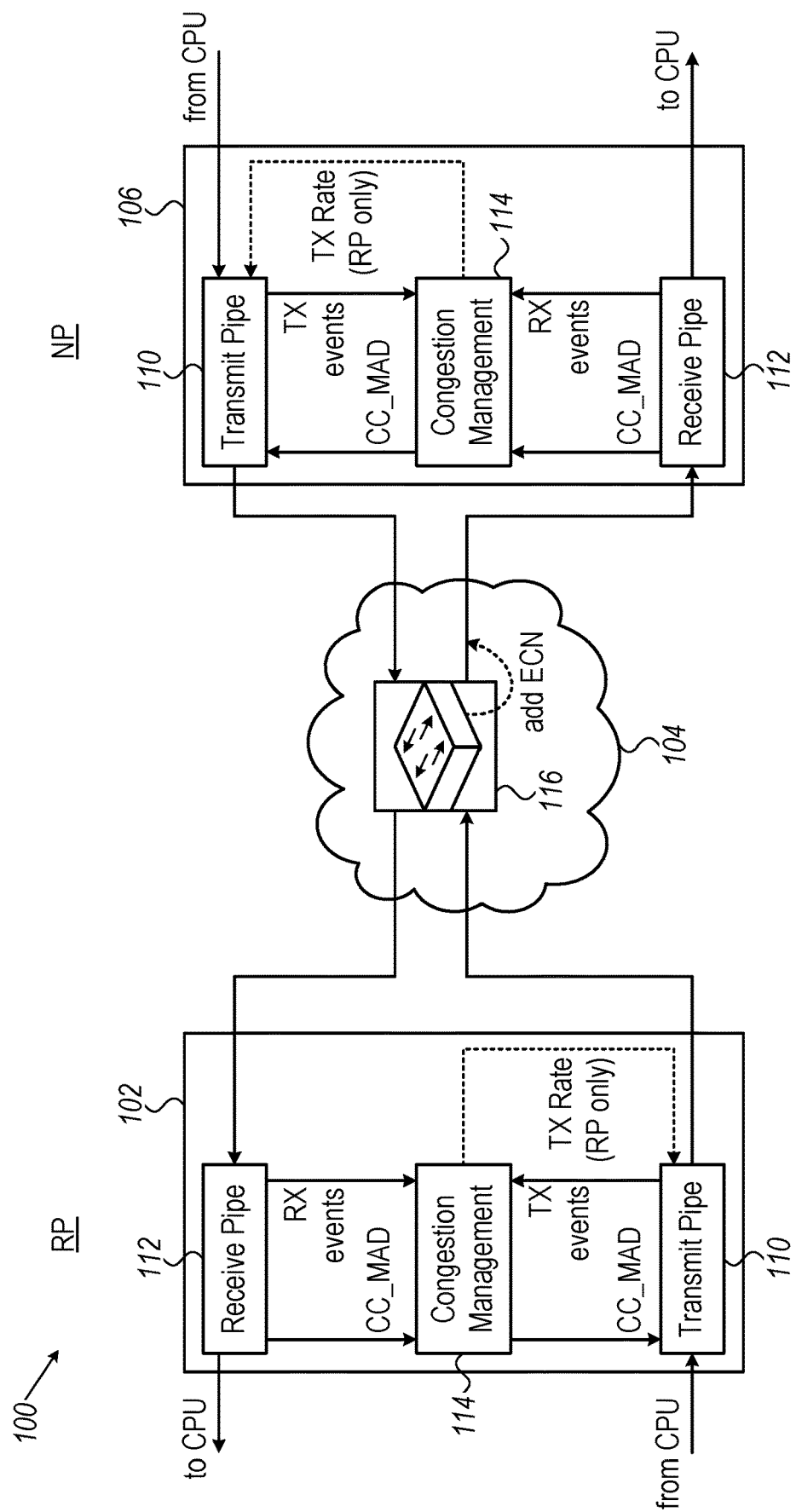
FIG. 1 is a block diagram that schematically illustrates a system that uses Remote Direct Memory Access (RDMA)

FIG. 1 is a block diagram that schematically describes an RoCE communication system 100 with congestion mitigation, in accordance with an embodiment of the present invention. A transmitting Network Adapter 102 transmits packets over a network 104 to a receiving Network Adapter 106. Both the transmitting Network Adapter and the receiving Network Adapter are configured to both transmit and receive packets; the terms "transmitting" and "receiving" hereinabove refer to the direction in which congestion is mitigated. According to the example embodiment illustrated in FIG. 1, Transmitting Network Adapter 102 and Receiving Network Adapter 106 may be identical (albeit differently configured).

Each of Transmitting Network Adapter 102 and Receiving Network Adapter 106 comprises a Transmit (TX) Pipe 110, which queues and arbitrates packets that the Network Adapter transmits; a Receive (RX) Pipe 112, which receives incoming packets from the network, and a Congestion Management unit 114.

Transmit Pipe 110 of Transmitting Network Adapter 102 queues and arbitrates egress packets, ands send the packets over Network 104. The egress packets may originate, for example, from a CPU (not shown) that is coupled to the network-adapter, or from Congestion Management 114.

The network comprises, according to the example embodiment illustrated in FIG. 1, a Switch 116, which, when congested, may mark packets that the transmitting Network Adapter sends with an Explicit Congestion indication (ECN).

Receiving Network Adapter 106 sends return packets back to the transmitting Network Adapter, including packets that are used for congestion control such as CNP packets, ACK/NACK packets, RTT measurement packets and Programmable CC packets (to be described below). When the Receiving Network Adapter receives a packet with ECN indication, the receiving Network Adapter sends a CNP packet back to the sending Network Adapter.

According to the example embodiment illustrated in FIG. 1, the network adapter may generate programmable CC packets, to facilitate various programmable congestion control algorithms (e.g., credit-based). In the example embodiment illustrated in FIG. 1, such programmable CC packets are InfiniBand™ Management Datagrams (MAD), and will be referred to hereinbelow as CC-MADs. In other embodiments, other CC packets may be used, instead of or in addition to the CC-MAD packets.

Congestion Management 114 is configured to execute congestion control algorithms, initiate sending of congestion control packets and mitigate congestion in the RoCE transmit path.

Congestion Management 114 receives Tx events when Transmit Pipe 110 sends bursts of packets, and Rx events when Receive Pipe 112 receives congestion notification packets. The received congestion notification packets may include, for example, ACK and NACK that are received in response to transmitted packets, CNP packets that the receiving Network Adapter generates in response to receiving ECN-marked packets, RTT measurement packets and congestion control packets.

Congestion Management 114 is configured to:
  i) receive events pertaining to the transmission of egress packets (or bursts of egress packets);
  ii) receive events pertaining to the receipt of congestion control packets;
  iii) control the Transmit Pipe to send RTT packets;
  iv) receive, from the Receive Pipe, returning RTT packets;
  v) build, send (via the Transmit Pipe) and receive (via the Receive Pipe) congestion-control packets;
  vi) run congestion control algorithms; and,
  vii) in a receiving network adapter—adjust the transmit rate as directed by the congestion control algorithms (in some embodiments, the congestion management runs the congestion control algorithms separately for each flow of packets, and the transmission rate is determined separately for each flow).

Thus, according to the example embodiment illustrated in FIG. 1, a congestion control circuitry handles congestion events and runs congestion control algorithms. To mitigate congestion in an RoCE network protocol (or in other suitable protocols), network adapter 102 comprises CC management circuits, which monitor egress traffic, initiate and receive congestion control packets and notifications, send and receive congestion-control packets and run a suitable congestion control algorithm; if the network adapter is the transmitting endpoint, the congestion control management also throttles the transmit rate.

As would be appreciated, the configuration of RoCE architecture 100 is an example configuration that is depicted purely for the sake of conceptual clarity. Other suitable configurations may be used in alternative embodiments of the present invention. For example, instead of (or in addition to) RoCE, the architecture may be TCP and/or converged Non-Volatile-Memory (NVM) storage (e.g., hyper-converged NVM-f).

FIG. 2 is a block diagram that schematically illustrates the structure of a Network Adapter 102 (FIG. 1), according to embodiments of the present invention. Network Adapter 102 may be a transmitting Network Adapter or a receiving Network Adapter. In the context of RoCE, the transmitting network adapter is a Reaction Point (RP), whereas the receiving network adapter is a Notification Point (NP).

Network Adapter 102 comprises a Transmit Pipe 110, a Receive Pipe 112 and Congestion Management 114 (all of which were briefly described above, with reference to FIG. 1). Transmit Pipe 110 comprises a Send-WQE (SXW) circuit 202, which is configured to exchange work-queue-elements (WQEs) and completion-queue elements (CQEs) with a CPU (not shown) that is coupled to the Network Adapter; and to generate egress packets. The transmit Pipe further comprises a Send-Packets (SXP) circuit 204, which is configured to queue, arbitrate and send packets over the network.

Receive Pipe 112 comprises a Parsing and Steering (PSA) circuit 206, which is configured to parse and steer ingress packets; and, a Receive Circuit (RXT) 208, which is configured to process ingress packets and to forward the ingress packets to a CPU that is coupled to the Network Adapter (typically, but not necessarily, the same CPU is coupled to the Transmit Pipe and to the Receive Pipe).

Congestion Management 114 comprises a Congestion Control Circuitry 210 and a Congestion Control Reduced Instruction Set Computer (CC-RISC) 212, which comprises one or more CPUs (e.g. RISC-V, or ARM), and is configured to execute congestion control algorithms using dedicated low-overhead software (will be referred to hereinbelow as Firmware, or FW).

Note that when an NP Network Adapter routes an RTT message back (after adding timestamps), the NP bypasses Congestion Management 114, and routes the RTT packets directly from the Receive Pipe to the Transmit Pipe; each pipe adding a timestamp to the packet.

In some embodiments, CCC 210 is configured to receive congestion control events and packets from the Receive and the Transmit pipes, to coalesce, queue and send such events to the CC-RISC, to receive responses from the CC-RISC and to send CC-RISC messages to the Transmit pipe.

The division between hardware and firmware congestion control tasks described above is cited by way of example. In alternative embodiments, any suitable division of the congestion-control tasks between hardware (e.g., CCC 210) and firmware (e.g., code running on CC-RISC 212) may be used. In an embodiment, some of the congestion control tasks may be executed by an external CPU.

SXW 202 sends Tx event notifications to CCC 210. Such events may include indications that bursts of packets are transmitted. In some embodiments, the SXW sends notifications corresponding to the transmission of a burst of packets of the same flow; in other embodiments, only notifications pertaining to a predefined subset (e.g., to packets that egress through a predefined port) are sent. An Address-Vector (AV) may be attached to the Tx-event notifications, to identify the packets flow. In alternative embodiments SXW 202 may send some or all the Tx events directly to CC-RISC 212.

RXT 208 sends CC Rx events notifications and ingress CC-packets to CCC 210. In some embodiments, the RXT sends only some of the notifications, e.g., according to the Ingress port that receives the notifications. The CC Rx events comprise received ACK packets, NACK packets, RTT measurement packets and (if the Network Adapter is a Receiving Network Adapter), ECN notifications. In some embodiments, the RXT sends ACK and NACK indications rather than the full ACK/NACK packets; in other embodiments, the RXT sends to the CCC only some of the notifications, e.g., according to the Ingress port that receives the notification. In yet other embodiments RXT 208 sends the Rx events and/or the CC-packets directly to CC-RISC 212.

CCC 210 is configured to receive Tx events and corresponding AV indications from the Transmit Pipe; and, Rx events and CC-packets from the Receive Pipe. The CCC may coalesce some or all the events and send coalesced groups of events and any CC-packets to the CC-RISC.

CC-RISC 212 receives CC events and CC-packets, either from CCC 210 or directly from SXW 202 and RXT 208. The CC-RISC is configured to run congestion control algorithms, and, responsive to the algorithms run, output indications to SXP 204 through CCC 210 (in some embodiments, the CC-RISC may send some or all output indications directly to SXP 204).

In some embodiments, when the Network Adapter is configured as an RP, the indications that CC-RISC 212 outputs to the pipes comprise: i) indications that the CC-RISC sends through the CCC: Send RTT indications (to measure the round-trip delay) and CC-packets; and, ii) indications that the CC-RISC sends directly to SXW 204: Tx Rate, for each flow of packets (in some embodiments, the CC-RISC sends increment-rate or decrement-rate indications; in other embodiments the CC-RISC always sends the updated rates of all flows).

In an embodiment, when the Network Adapter is configured as an NP, the indications that CC-RISC 212 outputs comprise CC-packets, which the Network Adapter may send back in response to some ingress packets.

The interface between CC-RISC 212 and CCC 210 may comprise coalesced CC events that the CCC sends to the CC-RISC, and events responses (including ACK, NACK, RTT) that the CC-RISC sends to the CCC. Typically, rather than events, the CCC sends to the CC RISC events descriptors, which are condensed representations of the corresponding events. The interface between the CCC and the CC-RISC further comprises CC-packets—the CCC forwards to the CC-RISC CC-packets that the CCC receives from the RXT; and, the CC-RISC may generate CC-packets, and send the CC-packets to the SXP via the CCC.

In various embodiments, variations of the CCC-CC-RISC interface described above may be used. E.g., in some embodiments the CCC may send Tx rate increment and decrement indications to the CCC; the CCC may store the current Tx rates for all flows, increment or decrement rate values in response to indications for the CC-RISC, and send the updated rate of all flows to the SXW.

To achieve reliable round-trip-time measurements, Network Adapter 112, when configured as an NP, should route RTT packets from input to output with minimal delay. In the example embodiment illustrated in FIG. 2, PSA 106 routes ingress RTT packets directly to SXP 204, which sends the RTT packets back to the network adapter that had sent the ingress RTT. Both PSA 206 and SXP 204 typically add, respectively, ingress and egress timestamps to the RTT packet that the NP network adapter transmits.

In some embodiments of the present invention, to avoid congestions in the processing of congestion control events, the congestion management is configured to discard (drop) some of the less important CC events.

As would be appreciated, the structure of Network Adapter 102 as illustrated in FIG. 2 is cited by way of example. Network Adapters in accordance with the disclosed techniques are not limited to the description hereinabove. In alternative embodiments, for example, some of the congestion control algorithms may be executed by hardware, e.g., by CCC 210; In an embodiment, CCC 210 is configured to execute all congestion control algorithms using hardware, and CC-RISC 212 may not be needed. In yet other embodiments, any suitable division of the congestion-control tasks between hardware (e.g., CCC 210) and firmware (e.g., CC-RISC 212) may be used, including, for example, dynamic division, based on the RISC-V workload.

In some embodiments, more events may be monitored, such as an Rx event upon every received packet. In an embodiment, the CCC or parts thereof may be embedded within the Transmit Pipe and/or within the Receive Pipe.

CC-Packets and CC-MAD Packets

In embodiments according to the present invention, peer NP and RP network adapters may exchange user-programmable congestion control (CC) messages. Such CC messages may comprise CC Management Datagrams (CC-MADs), and other types of packets, as defined by the programmer (the latter messages will be referred to as non-MAD CC packets).

CC-MADs are Management Datagrams (MADs), as defined by InfiniBand™ specifications, Volume 1, Release 1.4, Chapter 13.4. According to embodiments of the present invention, CC-MADs are encapsulated in CC-MAD packets (and, hence, are limited to 256 bytes), and are handled by Queue-Pair 1 (QP 1), which may be allocated a high priority in the Tx pipe. In some embodiments, the Congestion Management sends the CC-MADs directly to SXP 204 (FIG. 2), bypassing the queue-pair mechanism. In the NP, MAD detected by PSA 206 (FIG. 2) may get higher priority than other packets; in some embodiments such packets are routed directly to the CC management.

According to embodiments, users of the network adapter can define several CC-MAD types and insert special opcodes in the CC-MAD payload, to signal congestion-control events between peer network adapters.

FIG. 3 is a table that schematically illustrates the structure of a CC-MAD 300 in accordance with an embodiment of the present invention. A CC-MAD comprises 256 byes. Each line in FIG. 3 depicts the contents of four bytes (32 bits).

The first six entries of the CC-MADs (first six lines in FIG. 3; bytes 23:0) comprise MAD fields as defined by InfiniBand™. The Base Version (byte 3) value is 0x01. The Class (byte 2), Class-Version (byte 1) and Attribute-ID (bytes 18, 19) are Firmware Configurable (FW CR).

The next two entries of the CC-MAD (bytes 31:24) define a firmware-configurable 64-bit key. The key changes every preset time period (e.g., one second) according to a preset algorithm (e.g., by advancing a Feedback Shift Register (FSR). The purpose of the key is protection from hackers who may attempt to overwhelm the network adapter by sending a huge number of CC-MADs—the network adapter will reject any MAD packet that does not match the current key. Key checking is typically done by hardware in the Rx pipe, with little or no impact on performance.

The next entry (bytes 35:32) is an 8-bit FW-configurable capability mask (the unused bits are 0), which may be used to set a capability parameter for the packet (usage of the capability field in CC MAD packets is beyond the scope of the present invention). Next, byte 39 defines the congestion control message type, which may be set and defined according to the type of CC-MAD, and, bytes 38:36 define the message size in double-words (as the message size is limited to 256 bytes (64 double-words), at most 6 bits of this 24-bit field will be non-zero).

Bytes [255:44] are the payload of the CC-MAD, which may be set by the FW according to the needs of the selected congestion control algorithm. As the packet's length may vary, the last unused bytes are typically (but not necessarily) 0.

As would be appreciated, the structure of CC-MAD 300 as illustrated in FIG. 2 is cited by way of example. CC-MADs in accordance with the disclosed techniques are not limited to the description hereinabove. In alternative embodiments, CC-MADs may comprise more than 256 bytes; the contents and order of the various fields may be different. Security means other than an identification key may be used, including, for example, public-key-authentication.

In some embodiments, other types of control packets may be used for performing other types of control operations, instead of or in addition to CC-MADs. The Tx and Rx pipes, however, will assign lower priority to such control packets (QP-1, assigned to CC-MADs, will typically get high priority), and the security of such packets will not be checked by hardware.

API

In some embodiments, CCC to CC-RISC interface comprises an Application Programming Interface (API). In an example embodiment, the API comprises the following parameters:

| Field | Event Types | Description |
| --- | --- | --- |
| host_id | General | Host processor index |
| gvmi | General | Global Virtual Machine index |
| flow_tag | General | Flow index (or a hash function thereof) |
| ev_type | General | The type of the event |
| ev_subtype | General | valid only on FW and NACK event types. |
| interface | General | port number |
| flag: override | General | The last TX request has been overridden |
| flag: rtt_packet_sent | General | An RTT measurement packet has been sent |
| flag: ack_expected | General | An ACK to the sent burst is expected |
| SN | General | Tx - last sent serial number; RX - SN From packet ACK/NACK |
| timestamp | General | The time the packet is received or sent |
| protocol | Rx | Indicate the packet protocol (RoCE-IPv4, RoCe-IPv6 or IB) |
| cc_message | Rx | CC-MAD or non-CC-MAD packet |
| packet_ptr | Rx | Pointer to the beginning of the packet |
| data_ptr | Rx | Pointer to the packet payload |

Flowcharts

FIGS. 4A and 4B illustrate congestion management flows, for RP and NP configurations. The flowcharts are presented for the sake of conceptual clarity, and do not necessarily represent the order of the events; moreover, although according to FIGS. 4A, 4B and the descriptions thereof, Congestion Management 114 executes the flowcharts, in embodiments various steps of the flowcharts may be executed by other components of the network adapter, including Receive-Pipe 112, Transmit Pipe 110 and the CPU that is coupled to the network adapter (and is not shown).

FIG. 4A is a flowchart that schematically illustrates congestion control flow 400 in a network adapter that is configured as a Reaction Point (RP), in accordance with an embodiment of the present invention. The flowchart is executed by Congestion Management 114 (FIG. 2), using hardware (e.g., CCC 210) and/or using firmware (e.g., CC-RISC 212).

The flow starts at Get Tx Event step 402, wherein the Congestion Management receives from the Output Pipe any pending Tx events, such as notification that a burst of packets (corresponding to the same flow) has been sent. An Address vector may be received with each Tx event, indicating the destination of the burst of packets.

Next, at a Get Rx Event step 404, the congestion management receives from the Rx Pipe any pending Rx events, including ACK and NACK packets. In a Get Rx-RTT event 406, the congestion management receives from the Receive Pipe any returning RTT packets (that the RP network adapter had sent to the NP network adapter), which includes timestamps and facilitate the calculation of the round-trip time.

Next, in a Get-CC-MADs step 408, the congestion management receives from the Receive Pipe any CC-MAD that the Receive Pipe may have received from the network (typically originated by the NP network adapter).

After step 408, the congestion management has received all current CC inputs, and now enters a Run-CC-Algorithms step 410 (in some embodiments, the congestion management runs CC algorithm after all events, responsive to the event). The CC algorithms may vary and include a variety of existing and yet-to-be developed algorithms; the algorithms may change dynamically in response to varying network conditions, and to various packet flows.

In the next three steps, the CC-management may send outputs that were calculated in step 410. In an Output-Rate step 412, the CC-Management may output new Tx rates for each of the current packet flows. In some embodiments, the CC-Management outputs the Tx rates only for flows in which the rate has changed.

While in CC-Algorithm step 410, the CC-Management may decide to measure the round-trip time between the RP and the NP and/or to send a CC-MAD packet to the NP. In a Send-RTT step 414, the CC-management may send an RTT packet to the NP; and, in a Send CC-MAD step 416, the CC-Management may send a CC-MAD. After step 416, the Congestion-Management reenters step 402.

FIG. 4B is a flowchart that schematically illustrates congestion control flow 450 in a network adapter that is configured as a notification point (NP), in accordance with an embodiment of the present invention. Like flowchart 400, flowchart 450 is executed by Congestion Management 114 (FIG. 2), using hardware and/or firmware.

The flow starts at a Get-Rx-Event step 452, wherein the congestion management receives an Rx event from the Receive Pipe, such as receipt of packets from the RP. Some of the packets may have a set Explicit congestion notification (ECN) (the bit may have been set by a switch in the network, such as switch 116, FIG. 1). Additionally (or alternatively), in step 452, the congestion management may get a congestion notification from RXT 208, if ingress packets become congested at the RXT (that is, the rate at which ingress packets are processed is slower than the rate at which the packets are received).

Next, at a Get-CC-MAD step 454, the CC management gets any CC-MAD packets that the RP may have sent. After step 454, the CC management enters a Run-CC-Algorithms step 456 to process the Get Rx event. in step 45, the CC management may prepare responses and, possibly, a CC-MAD packet.

At a Notify-Congestion step 458, the CC management may send an explicit congestion notification packet (CNP) to the RP, or notify the congestion by other means; in a SEND CC-MAD step 462, the CC-management may send a CC-MAD (that was prepared in step 456) to the RP. After step 462 the CC-management reenters step 452.

According to the example embodiment illustrated in FIG. 4B, the CC-management, when in an NP configuration, runs a parallel RTT handling flow. The RTT handling flow starts at a Check-RTT step 464, wherein the Congestion Management checks if a new RTT is received from the RP. If a new RTT is not received, the Congestion Management will loop step 464 until an RTT is received. When an RTT is received, the Congestion Management will enter a Handle RTT step 466, wherein the Congestion Management will add timestamps to the RTT and send the modified RTT packet back to the RP. After step 466, the Congestion Management reenters step 464.

As would be appreciated, the flowchart illustrated in FIGS. 4A and 4B and described hereinabove are cited by way of example. In alternative embodiments other suitable flowcharts may be used. The steps of the flowchart may be executed in a different order; some or all the steps may be executed concurrently. According to the example embodiment illustrated in FIGS. 4A, 4B, events are queued in the Rx-Pipe and Tx-Pipe, which forward the events to the CC-Management at steps such as 402, 404, 452. In alternative embodiments the Rx-Pipe and/or the Tx-Pipe pass events to the CC-Management when such events are received; and the CC-Management may queue the events until needed. In other embodiments, the Rx-Pipe and/or the Tx-pipe may combine groups of events and send coalesced events to the CC-Management. In an embodiment, step 466 may be done by dedicated circuitry of the CC-management.

The configuration of the Network Adapter, including components and sub-components thereof, illustrated in FIGS. 1, 2 and 3 are example configurations that are depicted purely for the sake of conceptual clarity. Any other suitable configurations can be used in alternative embodiments. The different Network Adapter elements may be implemented using suitable hardware, such as in one or more Application-Specific Integrated Circuit (ASIC) or Field-Programmable Gate Arrays (FPGA), using hardware, using software, or using a combination of hardware and software elements.

CC-RISC 212 typically comprises one or more programmable processors, which are programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address congestion control in communication networks, the methods and systems described herein can also be used in other applications, such as in Adaptive Routing. Generally speaking, management circuitry in the network adapter may be configured to receive, from the Tx pipeline and from the Rx pipeline, events derived from at least some of the packets exchanged with the peer network adapter, exchange suitable user-programmable control packets with the peer network adapter, and perform a control operation responsively to the events and the user-programmable control packets. Any suitable control operation can be performed in this manner.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a receive (Rx) pipeline, configured to receive packets sent over a network by a peer network adapter, and to process the received packets;
a transmit (Tx) pipeline, configured to transmit packets to the peer network adapter over the network; and
congestion management circuitry, configured to:
receive user-defined Congestion-Control (CC) software code that executes a CC algorithm selected from among multiple different CC algorithms, wherein the selected CC algorithm specifies user-programmable congestion control packets to be exchanged between the congestion management circuitry and peer congestion management circuitry in the peer network adapter;
receive, from the Tx pipeline and from the Rx pipeline, CC events derived from at least some of the packets exchanged with the peer network adapter;
exchange the user-programmable congestion control packets specified in the selected CC algorithm with the peer congestion management circuitry in the peer network adapter; and
mitigate a congestion affecting one or more of the packets responsively to the CC events and the user-programmable congestion control packets, by executing the selected CC algorithm.

2. The network adapter according to claim 1, wherein the congestion affects the packets transmitted to the peer network adapter, and wherein the congestion management circuitry is configured to throttle, depending on the CC events and the user-programmable congestion control packets, a transmission rate of the packets transmitted by the Tx pipeline.

3. The network adapter according to claim 1, wherein the congestion affects the packets received from the peer network adapter, and wherein the congestion management circuitry is configured to generate a congestion notification based on the CC events and the user-programmable congestion control packets, and to send the congestion notification to the peer network adapter.

4. The network adapter according to claim 1, wherein the congestion management circuitry supports an Application Programming Interface (API) for receiving the user-defined Congestion-Control (CC) software code.

5. The network adapter according to claim 1, wherein the programmable congestion control packets have a format of Management Datagram (MAD) packets.

6. The network adapter according to claim 1, wherein the congestion management circuitry comprises a hardware congestion-control-circuitry configured to pre-process the CC events, and a user-programmable congestion control processor configured to mitigate the congestion responsively to the pre-processed CC events.

7. The network adapter according to claim 6, wherein the hardware congestion-control-circuitry is configured to coalesce two or more of the CC events, and to provide the coalesced CC events to the congestion control processor.

8. The network adapter according to claim 1, wherein the user-programmable congestion control packets have a payload format, which supports user-defined codes that coordinate execution of the selected CC algorithm between the congestion management circuitry and the congestion management circuitry in the peer network adapter.

9. A method for communication, comprising:
using a receive (Rx) pipeline of a network adapter, receiving packets sent over a network by a peer network adapter, and processing the received packets;
using a transmit (Tx) pipeline of the network adapter, transmitting packets to the peer network adapter over the network; and
using congestion management circuitry in the network adapter:
receiving user-defined Congestion-Control (CC) software code that executes a CC algorithm selected from among multiple different CC algorithms, wherein the selected CC algorithm specifies user-programmable congestion control packets to be exchanged between the congestion management circuitry and peer congestion management circuitry in the peer network adapter;
receiving from the Tx pipeline and from the Rx pipeline CC events derived from at least some of the packets exchanged with the peer network adapter;
exchanging the user-programmable congestion control packets specified in the selected CC algorithm with the peer congestion management circuitry in the peer network adapter; and
mitigating a congestion affecting one or more of the packets responsively to the CC events and the user-programmable congestion control packets, by executing the selected CC algorithm.

10. The method according to claim 9, wherein the congestion affects the packets transmitted to the peer network adapter, and wherein mitigating the congestion comprises throttling, depending on the CC events and the user-programmable congestion control packets, a transmission rate of the packets transmitted by the Tx pipeline.

11. The method according to claim 9, wherein the congestion affects the packets received from the peer network adapter, and wherein mitigating the congestion comprises generating a congestion notification based on the CC events and the user-programmable congestion control packets, and sending the congestion notification to the peer network adapter.

12. The method according to claim 9, and comprising receiving the user-defined Congestion-Control (CC) software code in the congestion management circuitry using an Application Programming Interface (API).

13. The method according to claim 9, wherein the programmable congestion control packets have a format of Management Datagram (MAD) packets.

14. The method according to claim 9, wherein mitigating the congestion comprises pre-processing the CC events using hardware congestion-control-circuitry, and mitigating the congestion responsively to the pre-processed CC events by a user-programmable congestion control processor.

15. The method according to claim 14, wherein preprocessing the CC events comprises coalescing two or more of the CC events, and providing the coalesced CC events to the congestion control processor.

16. The method according to claim 9, wherein the user-programmable congestion control packets have a payload format, which supports user-defined codes that coordinate execution of the selected CC algorithm between the congestion management circuitry and the congestion management circuitry in the peer network adapter.

17. A network adapter, comprising:
- a receive (Rx) pipeline, configured to receive packets sent over a network by a peer network adapter, and to process the received packets;
- a transmit (Tx) pipeline, configured to transmit packets to the peer network adapter over the network; and
- management circuitry, configured to:
  - receive user-defined software code that executes a control algorithm selected from among multiple different control algorithms, wherein the selected control algorithm specifies user-programmable control packets to be exchanged between the management circuitry and peer management circuitry in the peer network adapter;
  - receive, from the Tx pipeline and from the Rx pipeline, events derived from at least some of the packets exchanged with the peer network adapter;
  - exchange the user-programmable control packets specified in the selected control algorithm with the peer management circuitry in the peer network adapter, and
  - perform a control operation responsively to the events and the user-programmable control packets, by executing the selected control algorithm.

18. A method for communication, comprising:
- using a receive (Rx) pipeline of a network adapter, receiving packets sent over a network by a peer network adapter, and processing the received packets;
- using a transmit (Tx) pipeline of the network adapter, transmitting packets to the peer network adapter over the network; and
- using management circuitry in the network adapter:
  - receiving user-defined software code that executes a control algorithm selected from among multiple different control algorithms, wherein the selected control algorithm specifies user-programmable control packets to be exchanged between the management circuitry and peer management circuitry in the peer network adapter;
  - receiving, from the Tx pipeline and from the Rx pipeline, events derived from at least some of the packets exchanged with the peer network adapter;
  - exchanging the user-programmable control packets specified in the selected control algorithm with the peer management circuitry in the peer network adapter; and
  - performing a control operation responsively to the events and the user-programmable control packets, by executing the selected control algorithm.

* * * * *